G. CROMPTON & H. WYMAN.
Shuttle Box Mechanism for Looms.
No. 229,968. Patented July 13, 1880.
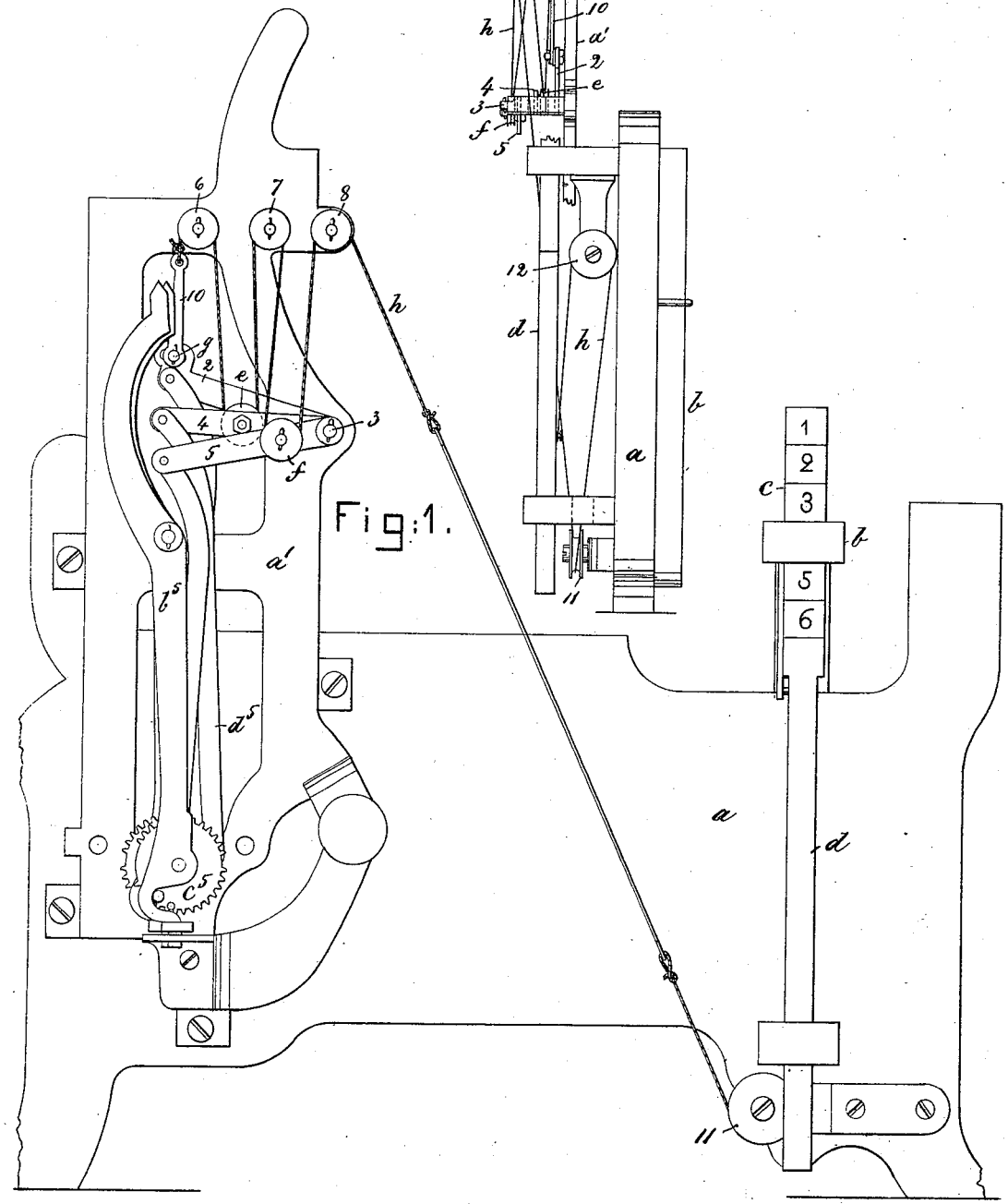
Witnesses.
L. F. Connor.
Jos. P. Livermore
Inventors.
George Crompton and
Horace Wyman
by Crosby & Gregory Attys

UNITED STATES PATENT OFFICE.

GEORGE CROMPTON AND HORACE WYMAN, OF WORCESTER, MASSACHUSETTS, ASSIGNORS TO SAID GEORGE CROMPTON.

SHUTTLE-BOX MECHANISM FOR LOOMS.

SPECIFICATION forming part of Letters Patent No. 229,968, dated July 13, 1880.

Application filed December 26, 1879.

*To all whom it may concern:*

Be it known that we, GEORGE CROMPTON and HORACE WYMAN, of Worcester, county of Worcester, State of Massachusetts, have invented an Improvement in Shuttle-Box Mechanisms for Looms, of which the following description, in connection with the accompanying drawings, is a specification.

This invention relates to mechanisms for operating shuttle-boxes in looms, and is herein shown as adapted to operate a series of six shuttle-boxes and place any one of the series in position at the level of the raceway of the lay.

In this our invention we employ a main lever, which at one end has attached to it one end of the shuttle-box-moving chain, cord, or flexible connection, and with it we employ two independent but auxiliary levers, each provided with a sheave, the said sheaves being located at different distances from the common fulcrum of the two levers, and, as herein shown, each of the said sheaves carried by the said levers is less remote from the fulcrum of the said levers than the point of connection of the box-moving chain with the main lever, and with the three levers mentioned we employ, as herein shown, three stationary sheaves, as hereinafter set forth.

Figure 1 represents, in side elevation, a sufficient portion of a loom to illustrate our present improvement, the middle one of the two auxiliary or sheave-carrying levers being supposed to be moving from one to its other position between the two other levers; but it will be understood that in practice the lever will never stop in that position; and Fig. 2 is a partial front-end view of Fig. 1, the shuttle-boxes being broken off from the box-rod.

In the drawings, $a$ $a'$ are supposed to represent the side of a loom-frame; $b$, the lay; $c$, the series of shuttle-boxes; $d$, the shuttle-box rod; $c^5$, the toothed cranks, and $d^5$ the connecting-rods. These toothed cranks and connecting-rods are common devices, and may be operated as are like devices in United States Patent No. 209,714, November 5, 1878, to which reference may be had, or by devices shown in an application filed by us for Letters Patent of the United States on the 21st day of November, 1879, that application also showing the shifters $b^5$, to throw at the proper times the toothed cranks into engagement with the one or the other of its operating toothed wheels or gear of usual construction. (Not herein shown.)

The main shuttle-box lever 2 has its fulcrum on a stud, 3, as have also the auxiliary shuttle-box levers 4 5. Each shuttle-box lever has its own connecting-rod and toothed crank, and the three levers are substantially of the same length. Lever 4 has a sheave, $e$, and lever 5 a sheave, $f$. The sheave of lever 4 is substantially twice as remote from the fulcrum 3 as is sheave $f$, and the point of attachment $g$ of the shuttle-box chain, cord, or flexible connection $h$ with the main lever is substantially twice as remote from the fulcrum 3 as is the sheave $e$. Consequently the said levers, although they have the same throw each, so operate as to draw upon and move the box-chain and boxes for different distances. Above and substantially in line with the said levers are located on fixed studs or pins three sheaves, 6 7 8. The shuttle-box chain $h$, connected with the outer end of the main shuttle-box lever, as herein shown, by the intervention of a long link, 10, is passed over the sheave 6, thence down under and about sheave $e$ on lever 4, thence upward and down about sheave 7, under and up about sheave $f$ on lever 5, thence upward and down about sheave 8 to and partially about the sheaves 11 and 12, to the shuttle-box rod, with which the opposite end of this chain is joined.

When all the levers are in their highest positions box No. 1 will be in position. Box No. 2 may be reached by moving lever 5 to its lowest position, levers 2 and 4 remaining up. Box No. 3 may be reached by depressing lever 4, leaving levers 2 and 5 up. Box No. 4 may be reached by depressing levers 4 and 5, leaving lever 2 up; box No. 5 by depressing levers 2 and 4, leaving lever 5 up, and box No. 6 by depressing all the said levers. By moving these levers at the proper time any one of the said boxes may be placed at any time in position to have its shuttle thrown.

As herein shown, the operative portions of the said levers 2 4 5 act upon the chain $h$ at different distances from the fulcrum upon which the said levers are supported, and the levers are of the second order; but it is obvious that instead of attaching the connecting-rods to the said levers, as shown, the same movement and method of operation of the levers would be preserved by extending each of the levers 2 4 5 back or to the right of the fulcrum 3 for equal distances, thereby making the said levers levers of the first order, and to such extended ends would be attached the connecting-rods now shown attached to the ends of the said levers at the left of the fulcrum 3, the toothed cranks in such modification being made to occupy a position substantially under the ends of the said levers, so that the connecting-rods might be substantially in vertical position. This modification will be so clear to a mechanic that we have deemed it entirely unnecessary to show it in the drawings.

We claim—

In a loom, the combination of the following instrumentalities, viz: a main shuttle-box lever, an auxiliary lever, 5, having a sheave, $f$, upon it, an auxiliary lever, 4, having a sheave, $e$, upon it at a distance from its fulcrum substantially twice as great as the distance between the sheave $f$ and the fulcrum of its lever, three independent fixed sheaves, 6 7 8, a series of six shuttle-boxes, a chain or cord and guiding mechanism therefor, said chain or cord being connected with the shuttle-box rod and with the end of the main shuttle-box lever at a point substantially twice as remote from its fulcrum as is the sheave $e$ from the fulcrum of its lever, a connecting-rod for each of the said levers, and mechanism for operating the said connecting-rods, substantially as and for the purpose described.

In testimony whereof we have signed our names to this specification in the presence of two subscribing witnesses.

GEO. CROMPTON.
HORACE WYMAN.

Witnesses:
J. B. SYME,
J. A. WARE.